United States Patent [19]
Lee

[11] Patent Number: 5,975,314
[45] Date of Patent: Nov. 2, 1999

[54] SHIPPING RACK

[75] Inventor: Wen-Wei Lee, Warsaw, Ind.

[73] Assignee: Dana Corporation, Toledo, Ohio

[21] Appl. No.: 09/050,704

[22] Filed: Mar. 30, 1998

[51] Int. Cl.[6] .................................................... A47F 5/00
[52] U.S. Cl. ........................ 211/13.1; 211/70.1; 206/485
[58] Field of Search ................................ 211/60.1, 13.1, 211/70.1, 74; 410/47, 49; 206/443, 485

[56] References Cited

U.S. PATENT DOCUMENTS

| | | | |
|---|---|---|---|
| 2,457,197 | 12/1948 | Beckmann | 211/70.1 |
| 2,656,931 | 10/1953 | Bekmann | 211/70.1 |
| 3,384,228 | 5/1968 | Cannon | 206/485 |
| 3,606,023 | 9/1971 | Edmunds . | |
| 4,341,308 | 7/1982 | Pasquini | 206/485 X |
| 4,403,697 | 9/1983 | Forshee | 211/13.1 |
| 4,610,362 | 9/1986 | Remp et al. . | |
| 4,815,922 | 3/1989 | Midorikawa . | |
| 5,433,322 | 7/1995 | Williams . | |
| 5,505,309 | 4/1996 | Taravella et al. | 206/485 |

*Primary Examiner*—Robert W. Gibson, Jr.
*Attorney, Agent, or Firm*—Oldham & Oldham Co., L.P.A.

[57] ABSTRACT

A shipping rack is provided for safe and secure transport of a plurality of generally elongate workpieces, each of the plurality of workpieces having a longitudinal axis and distinctly different first and second ends. The shipping rack comprises a rectangular base with a vertical members extending perpendicularly upwardly from the four corners of the base. Affixed to the vertical members are at least one pair of horizontal support members. Each such pair is positioned in spaced apart parallel relationship. Across the length of the horizontal support members are a plurality of pairs of alternating first and second slots for receiving the first and second respective ends of the workpieces. Because of the difference in depth of the first and second slots, the workpieces are held in the pair of support members with the axis thereof at an angle of about 5 degrees relative to the horizontal.

12 Claims, 2 Drawing Sheets

SHIPPING RACK

The present invention relates to a shipping rack, particularly a shipping rack for transporting axle tube assemblies (actually half-axle tube assemblies) for a vehicle from one factory to another. Even more particularly, the present invention relates to a shipping rack which positions the axle tube assemblies so that they are "head to toe" with adjacent axle tube assemblies.

BACKGROUND OF THE INVENTION

In assembly of vehicles, it is quite common to pre-assemble some of the parts at one site and to transport them to another site for final assembly. A particular part, the half-axle tube assembly, contains a steering dampener bracket which has demonstrated its fragility and that it can be easily damaged during transport.

Several pieces of the prior art teach devices for shipping rods, tubes and the like which are longitudinally symmetrical, unlike the present invention. These devices generally hold the tubes in a horizontal manner. The devices which teach the packaging of pieces which are not longitudinally symmetrical, such as wine bottles, usually hold the pieces in a "head to head" manner, that is, the adjacent pieces are all faced in the same direction rather than being faced in opposite directions.

SUMMARY OF THE INVENTION

It is therefore an advantage of the present invention to provide a shipping rack which allows efficient and secure transport of the tube assemblies. This advantage of the present invention is provided by a shipping rack for transporting a plurality of generally elongate workpieces, each of the plurality of workpieces having an axis and distinctly different first and second ends. The shipping rack comprises a frame providing vertical members and at least one set of horizontal support members, each said set comprising a first and a second support member positioned in spaced apart parallel relationship on the vertical members, wherein each said first and second support member comprising the sets of horizontal support members has alternating first and second slots for receiving the first and second respective ends of the workpieces, with the first slots in the first support member of each set being positioned opposite the second slots in the second support member of the same set.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

Figure 1:
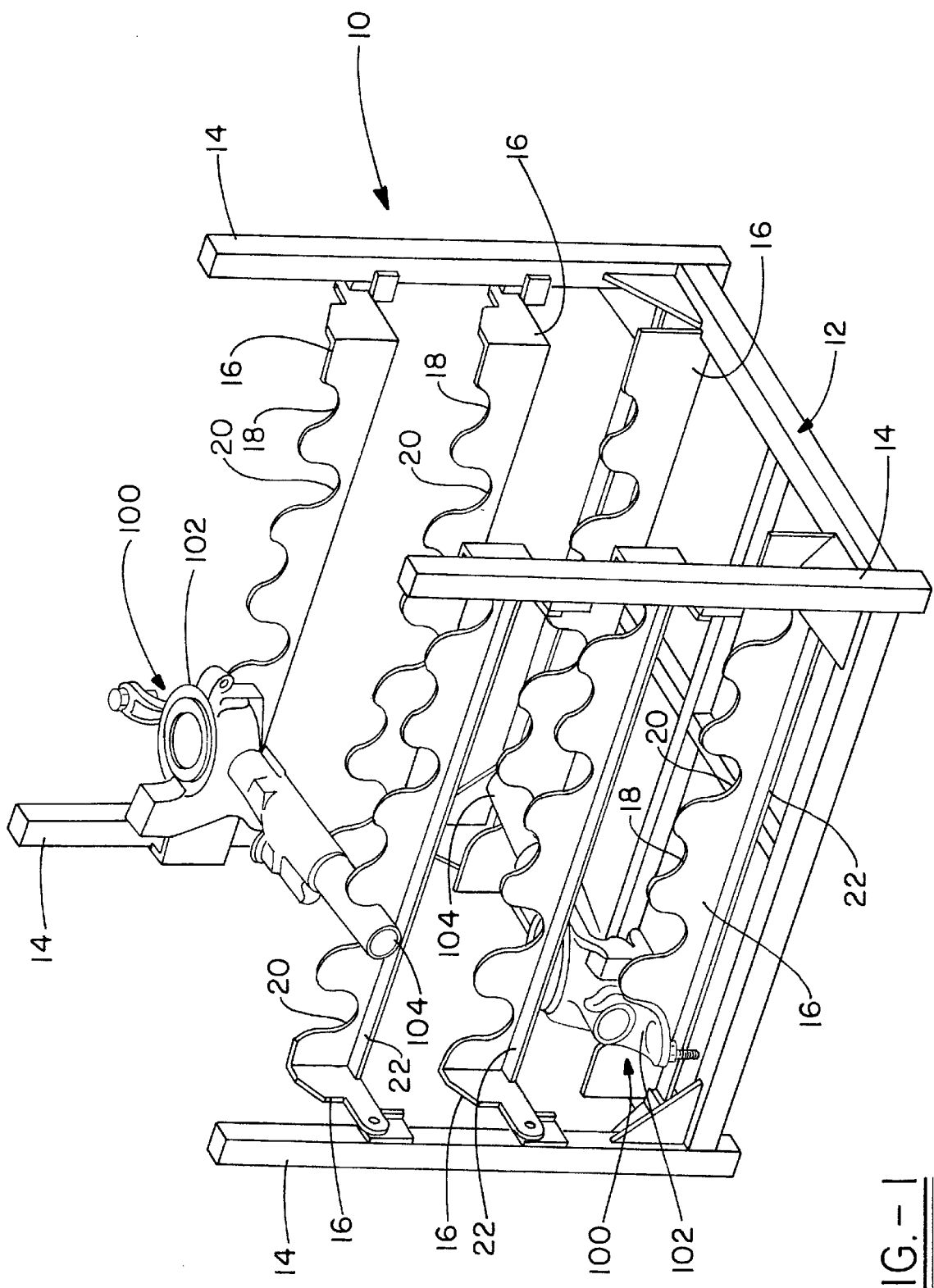
FIG. 1 shows a perspective view of the shipping rack of the present invention.

The shipping rack 10 of the present invention is shown in perspective view in FIG. 1. The rack 10 comprises a rectangular base 12, the four corners of which provide sites for mounting vertical members 14, which are typically welded in place and maintained in their vertical orientation by the use of triangular support brackets 16 which are also welded into place. Each of these vertical members 14 provides a plurality of sites for mounting horizontal support members 16. The horizontal support members 16 may be permanently affixed, as by welding, to the vertical members 14 at the ends of the horizontal support members or they may be removably affixed, as through the use of fasteners. The horizontal support members 16 are mounted in aligned pairs to opposing vertical members 14, so that a given pair of the horizontal support members oppose each other and provide a plurality of sites for holding the ends of the workpieces to be shipped in the completed rack 10.

The individual horizontal support members 16 are mounted on the respective vertical members 14 in a back to back manner, so that a front surface of each of the pair of horizontal support members faces outwardly from the rack 10. As is seen more clearly in FIG. 2, which is a front elevational view of one of the horizontal support members 16, there are six support slots cut out from the top surface of the horizontal support member. The six support slots are three first or shallow slots 18 and three second or deep slots 20. The first and second support slots 18, 20 are alternating, so that the leftmost slot is a first support slot 18 and the rightmost support slot is a second support slot 20. The support slots 18, 20 are evenly spaced along the length of the horizontal support member 16, so that when the pair of horizontal support members are affixed to the vertical members 14 of the shipping rack 10, each support slot on the first of the horizontal support members 16 is aligned with a support slot on the second of the horizontal support members. Even further, the alignment is such that every first support slot 18 on the first of the pair of horizontal support members 16 is aligned with a second support slot 20 on the second of the pair of opposing horizontal support members 16 and every second support slot 20 on the first of the pair of horizontal support members is aligned with a first support slot 18 on the second of the pair of opposing horizontal support members. The difference in the depths of the first and second support slots 18, 20, as measured from the top of the horizontal support member 16 is sufficient that when a workpiece having a longitudinal axis is placed in the spaced apart and affixed pair of horizontal support members, the axis will form an angle of approximately 5 degrees with the horizontal. Because of the "head to toe" arrangement of the workpieces and the alternation of the first and second support slots 18, 20, the angles formed by any pair of adjacent workpieces will be opposing rather than the same, although the quantitative size of the angles will be the same.

Figure 2:
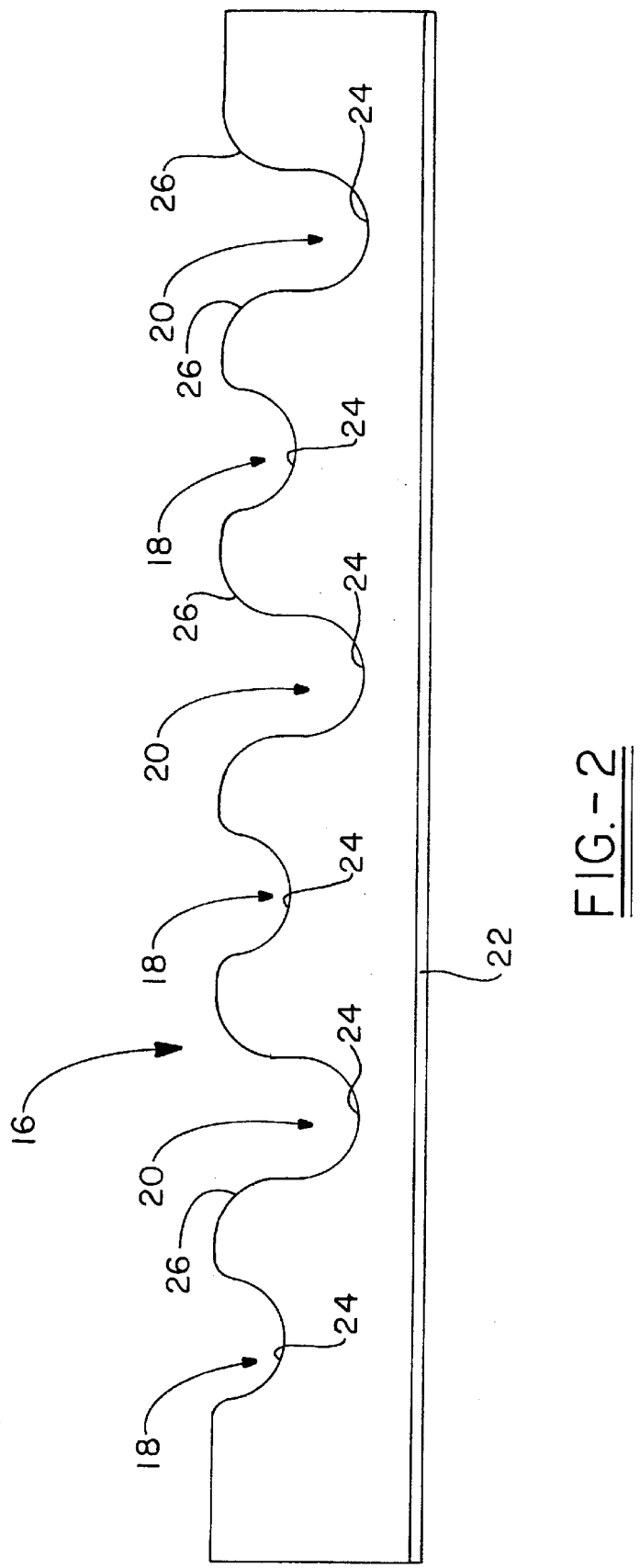
FIG. 2 shows a front elevational view of the horizontal support member of the present invention in isolation.

As will be further seen from FIGS. 1 and 2, the preferred method of constructing the horizontal support members 16 is from a piece of angle metal, preferably iron, with the flange 22 of the piece of angle metal providing a perpendicularly extending horizontal component along the lower surface which tends to strengthen and reinforce the support member 16.

The first and second support slots 18, 20 have at least an arcuate concave lower portion 24 and the second support slots 20 have an arcuate convex upper portion 26. These arcuate portions 24, 26 facilitate the seating of the workpiece in the support slot.

In the embodiment shown in FIG. 1, the shipping rack 10 of the preferred embodiment has three tiers of the horizontal support members 16. Each of the tiers is preferred to accommodate six of the workpieces, so a total of eighteen workpieces may be transported in a single rack 10 as shown. In order to have a first support slot 18 aligned with an opposing second support slot 20 for all of the workpiece slots and to have only one type of horizontal support member 16, it is necessary to have the alternating first and second slots on the horizontal support member in pairs, which requires a even number of total support slots. If there is a greater number of first support slots than there is second support slots on a particular horizontal support member, the opposing horizontal support member would need to have a number of the second support slots corresponding to the number of first support slots on the first horizontal support member.

Also shown in FIG. 1 are a pair of the workpieces, in this case being vehicle half-axle tube assemblies 100 with a first end 102 having a steering dampener bracket installed thereon and a second end 104. The assemblies 100 are positioned in the shipping rack 10 in a "head to toe" arrangement.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A shipping rack for transporting a plurality of generally elongate workpieces, each of the plurality of workpieces having a longitudinal axis and distinctly different first and second ends, the shipping rack comprising:

a frame providing vertical members at least one pair of horizontal support members, each said pair comprising a first and a second support member positioned in spaced apart parallel relationship and mounted to the vertical members;

wherein said frame comprises a rectangular base with said vertical members extending perpendicularly away from said base at each of the four corners thereof;

wherein each said first and second support member comprising the sets of horizontal support members has alternating first and second slots for receiving the first and second respective ends of the workpieces, with the first slots in the first support member of each set being positioned opposite the second slots in the second support member of the same set.

2. A shipping rack for transporting a plurality of generally elongate workpieces, each of the plurality of workpieces having a longitudinal axis and distinctly different first and second ends, the shipping rack comprising:

a frame providing vertical members at least one pair of horizontal support members, each said pair comprising a first and a second support member positioned in spaced apart parallel relationship and mounted to the vertical members;

wherein each said first and second support member comprising the sets of horizontal support members has alternating first and second slots for receiving the first and second respective ends of the workpieces, with the first slots in the first support member of each set being positioned opposite the second slots in the second support member of the same set;

wherein each said horizontal support member comprises a length of angle metal, with the flange portion of the angle member located along a bottom edge thereof.

3. The shipping rack of claim 1 wherein the first and second support members have the first and second slots positioned therein such that the workpieces are held in the set of support members with the axis thereof at an angle of about 5 degrees relative to the horizontal.

4. The shipping rack of claim 1 wherein each said horizontal support member comprises a length of angle metal, with the flange portion of the angle member located along a bottom edge thereof.

5. The shipping rack of claim 2 wherein the frame comprises a rectangular base with a vertical member extending perpendicularly away from the base at each of the four corners thereof.

6. The shipping rack of claim 1 wherein each said horizontal support member has one said first support slot for each said second support slot.

7. The shipping rack of claim 6 wherein each said horizontal support member has three said first support slots and three said second support slots.

8. The shipping rack of claim 1 wherein each said first and second support slot has a concave lower portion and a convex upper portion.

9. The shipping rack of claim 2 wherein the first and second support members have the first and second slots positioned therein such that the workpieces are held in the set of support members with the axis thereof at an angle of about 5 degrees relative to the horizontal.

10. The shipping rack of claim 1 wherein each said horizontal support member has one said first support slot for each said second support slot.

11. The shipping rack of claim 4 wherein each said horizontal support member has three said first support slots and three said second support slots.

12. The shipping rack of claim 1 wherein each said first and second support slot has a concave lower portion and a convex upper portion.

* * * * *